United States Patent [19]

Zschiesche

[11] Patent Number: 4,928,799

[45] Date of Patent: May 29, 1990

[54] HYDRAULIC DASHPOT

[75] Inventor: Lothar Zschiesche, Godenstedt, Fed. Rep. of Germany

[73] Assignee: LISEGA GmbH, Fed. Rep. of Germany

[21] Appl. No.: 351,619

[22] Filed: May 15, 1989

[30] Foreign Application Priority Data

May 18, 1988 [DE] Fed. Rep. of Germany ....... 3816821

[51] Int. Cl.⁵ .......................... F15B 15/22; F16L 3/24
[52] U.S. Cl. .................... 188/314; 188/322.13; 188/322.21; 188/352; 267/221
[58] Field of Search ............. 188/314, 322.13, 322.14, 188/315, 316, 322.21, 322.19, 352, 311, 312, 313, 286, 287, 298, 297; 267/64.15, 217, 221, 226, 64.28

[56] References Cited

U.S. PATENT DOCUMENTS

| 2,384,186 | 9/1945 | Magrum et al. | 188/322.13 X |
| 2,714,429 | 8/1955 | Etherton | 188/314 X |
| 2,853,159 | 9/1958 | Kuhn, Jr. | 188/312 X |
| 3,307,842 | 3/1967 | Ellis, Jr. | 188/287 X |
| 3,584,331 | 6/1971 | D'Hooge | 188/287 X |
| 3,638,885 | 2/1972 | Reed | 188/312 X |
| 3,972,396 | 8/1976 | Bochnak | 188/312 |
| 4,010,829 | 3/1977 | Naito et al. | 188/314 X |
| 4,153,237 | 5/1979 | Supalla | 267/64.15 |
| 4,256,293 | 3/1981 | Burgess | 188/314 X |
| 4,280,600 | 7/1981 | Salmon et al. | 188/312 |
| 4,311,302 | 1/1982 | Heyer et al. | 188/314 X |
| 4,546,959 | 10/1985 | Tanno | 188/314 X |
| 4,695,226 | 9/1987 | Marchitto et al. | 188/314 X |
| 4,819,770 | 4/1989 | Hahn | 188/286 X |
| 4,838,392 | 6/1989 | Miller et al. | 188/286 X |

Primary Examiner—Douglas C. Butler
Attorney, Agent, or Firm—Diller, Ramik & Wight

[57] ABSTRACT

A hydraulic dashpot comprising a cylinder, a piston separating the cylinder into a pair of chambers, a rod connected to the piston and projecting outwardly of the cylinder, a storage chamber for compensating hydraulic fluid, and a passage for conducting compensating fluid between the storage chamber and the pair of chambers. A first valve is provided in the passage for controlling fluid flow between the passage in at least one of the pair of chambers with the first valve being accommodated in a first valve body. A second valve is immediately upstream of the first valve body and closes fluid communication through the passage in a direction away from the storage chamber in automatic response to the removal of the first valve body from the passage.

14 Claims, 2 Drawing Sheets

HYDRAULIC DASHPOT

BACKGROUND OF THE INVENTION

The invention relates to a hydraulic dashpot particularly adapted to be used for suspendingly supporting a load, such as a pipe line, and specifically a storage housing having a fluid chamber for storing the hydraulic compensating fluid. The storage housing includes at least one valve in a bypass conduit extending from the fluid chamber to the rod and head chambers of the hydraulic dashpot.

Hydraulic dashpots are used to suspendingly support a pipe line because they can accurately provide a slight adjusting force to compensate for or react to slow displacement of the pipe line, e.g., because of a change of temperature. In case of undesired, jerky movements created by unexpected load events, the dashpot causes fluid blocking and immediately insures a nearly rigid connection. The reaction to such load events is controlled by valve or valves mounted in the hydraulic flow line from the storage chamber to the dashpot chambers. At times such valves have to be removed, required and/or inspected. At the same time the hydraulic flow line is opened. Therefore, prior to the removal of the valves from the hydraulic flow lines it is necessary to evacuate the hydraulic fluid from the system or at least from the storage chamber. This is a rather complicated and time-consuming task.

SUMMARY OF THE INVENTION

It is an object of the present invention to provide a hydraulic dashpot of the foregoing type in which the valves may be removed and inspected without the need of evacuating the storage chamber. The problem is solved according to the invention in that in the hydraulic flow line from the storage chamber to the valve, there is mounted an independent closing member which closes the hydraulic flow line by the valve automatically occupying a fluid blocking position upon the removal of the valve body.

As a result of such a design of the hydraulic dashpot, the pressurized storage chamber is automatically closed and kept closed if, for inspection purposes, the valve is removed from the housing. In such case the closing system operates automatically. Furthermore, upon reassembly of the valve the flow line is released again as the valve body is mounted in the housing. The pressurized storage chamber is thereby safely locked against fluid flow. Losses of the pressurized medium are safely avoided when the valve is removed, inspected and reinstalled or replaced.

According to another feature of the invention, the closing member consists of a body biased by a spring for displacement transversely to the valve body. In this case, the closing body cooperates with an outer periphery of the valve body for opening and closing functions.

Preferably, the closing body is a cylindrical hollow sleeve which, via at least one opening, communicates with the hydraulic flow line. A chamfered end of the cylindrical sleeve rests against an inclined or conical portion of the valve body. Due to the chamfered and oblique surfaces, the mutual friction during the displacement of the sleeve and/or of the valve body is reduced.

An upstream end of the sleeve is provided with a seat surface adapted to cooperate with a counterseat surface of the housing. Thus, the flow line is reliably maintained in closed condition when the valve body is removed. The sleeve is thereby closed in the flow direction of the hydraulic fluid.

With the above, and other objects in view that will hereinafter appear, the nature of the invention will be more clearly understood by reference to the following detailed description, the appened claims and the several views illustrated in the accompanying drawings.

DESCRIPTION OF THE PREFERRED EMBODIMENT

Figure 1:
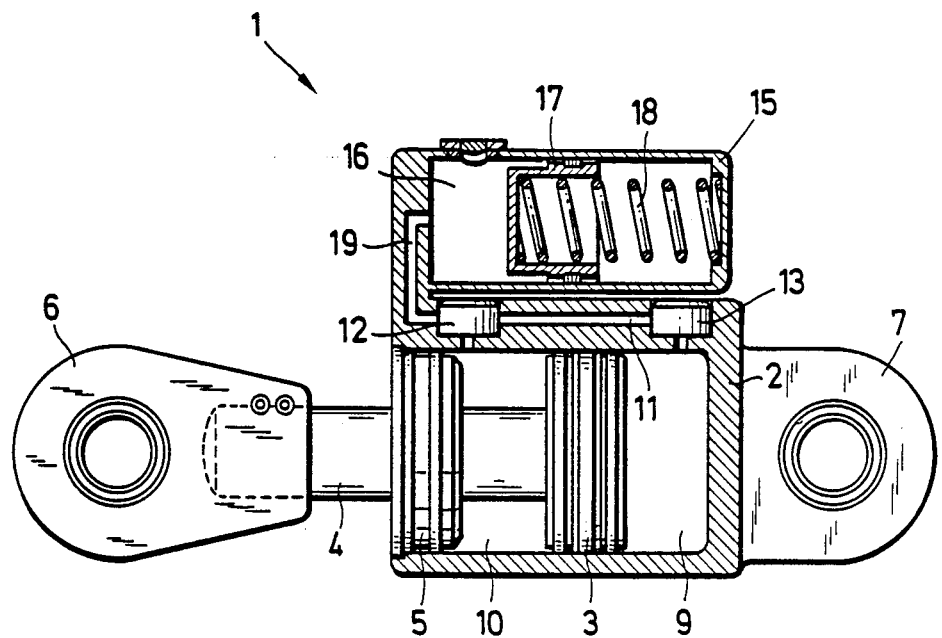
FIG. 1 is a side elevational view, partially in cross section, and illustrates a hydraulic dashpot of the invention.

The hydraulic dashpot 1 comprises a housing 2 in the form of a cylinder housing a piston 3 whose rod 4 extends through a cover 5. At the rod end of the piston rod 4 there is a connecting element 6 while another connecting element 7 is integrally formed as part of the housing 2. The connecting elements 6 and 7 are provided to connect the dashpot 1 between a stationary mounting and with a movable load which is to be braked, e.g., a suspendingly supported pipe line.

The cylinder chambers 9 and 10 upstream and downstream of the piston 3 are in fluid communication through a bypass line or conduit 11 in which are mounted valves 12 and 13 for controlling the circulation of the hydraulic fluid in the cylinder chambers 9 and 10. A hydraulic fluid storage housing 15 is provided outside housing 2 and includes a pressure storage chamber or space 16 for hydraulic fluid which is pressurized by a piston 17 and a spring or spring system 18. From the storage chamber 16 a feed line 19 extends to the bypass line 11 of cylinder chambers 9, 10.

Figure 2:
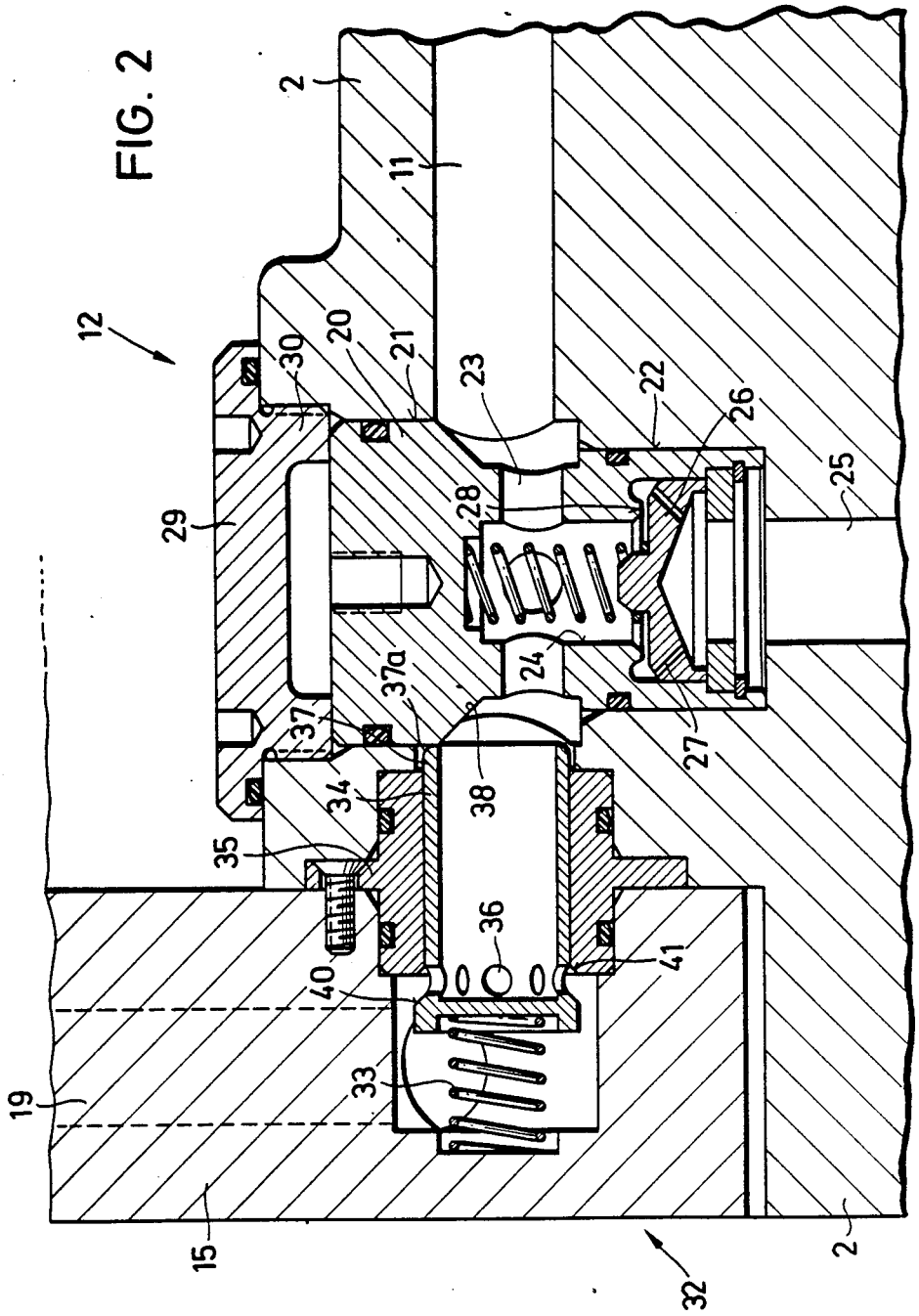
FIG. 2 is an enlarged fragmentary cross sectional view, and illustrates details of the hydraulic dashpot.

The valve 12 is located at a juncture between the feed line 19 from the storage chamber 16 and the bypass line 11 (see FIG. 2). The valve 12 includes a body 20 housing or seated in bores 21, 22. The body 20 contains a through bore 23 and another bore 24 in fliud communication with an inlet or inlet bore 25 communicating with the cylinder space 10. The bore 24 houses a nonreturn valve 26 containing at least one relatively narrow through bore 27. In case of sudden shock, the nonreturn valve 26 closes against an annular sealing surface or valve seat 28 to prevent the through flow of fluid from one cylinder chamber 9, 10 to the other and vice versa. A cover 29 is provided with a threaded portion 30 to stationarily secure the body 20 in bores 21, 22.

The hydraulic feed line 19 extending from the storage chamber 16 to the valve 12 accommodates a closing member 32 which is biased by a spring 33. The closing member 32 is a cylindrical hollow element sleeve or sleeve valve positioned to be displaceable longitudinally in an intermediate housing 35. At the end (unnumbered) of the sleeve 34 adjacent the feed line 19 there is at least one passage or hole 36, while another chamfered end 37 of the sleeve 34 abuts against the outer periphery of the valve body 20 which is provided with an oblique or conical surface 38. The oblique surface 38 is preferably in the form of a cone portion which in case of removal and reassembly of the valve body 20, cooperates with the chamfered end 37 of the sleeve 34, particularly to virtually immediately cause closing of the sleeve valve 34 upon initial removal motion (upward in FIG. 2) of the valve body 20. In flow direction, a front end of the sleeve 34 has an annular seat or face 40 adapted to cooperate with a counterseat or face 41 of the intermediate housing 35.

In the assembled condition of the valve 12, as shown in FIG. 2, the closing member 32 is held open against the action of the spring 33. As a result, a flow connection is formed from the feed line 19 via the passages or holes 36 to the bore 23 and the bypass conduit 11. When the valve body 20 is removed from bores 21, 22, the end 37 of the sleeve 34 may be displaced to the right, as viewed in FIG. 2 into the space provided by the cone portion 38. The spring 33 becomes operative to shift the sleeve 34 to the right allowing the seat surfaces 40 and 41 to abut to close flow through the feed line 19. As a result no hydraulic fluid may flow out of the feed line 19 to the bypass line 11 and out of the bores 21, 22. Upon assembly of the valve body 20 into the bores 21, 22, the cone surface 38 strikes a round or chamfered end 37a of the sleeve 34 resulting in the sleeve 34 being displaced towards the feed line 19 under the action of spring 33. The seat surfaces 40, 41 are opened and the pressure medium may flow again through the line 19 to the cylinder chambers 9, 10. The closing system is thereby operated automatically in response to the respective position of the valve body 20 relative to the bores 21, 22. If the valve body 20 is removed from the bores 21, 22, partially or totally, the pressure medium cannot flow out of the storage chamber 16. Upon assembly of the valve body 20 into the bores 21, 22 the closing system opens automatically.

Although a preferred embodiment of the invention has been specifically illustrated and described herein, it is to be understood that minor variations may be made in the apparatus without departing from the spirit and scope of the invention as defined in the appended claims.

I claim:

1. A hydraulic dashpot comprising a cylinder, a piston separating said cylinder into a pair of chambers, a rod connected to said piston and projecting outwardly of said cylinder, means for defining a storage chamber for compensating fluid, passage means for conducting compensating fluid between said storage chamber and said pair of chambers, first valve means in said passage means for controlling fluid flow between said passage means and at least one of said pair of chambers, a first valve body accommodating said first valve means, and second valve means immediately upstream of said first valve body for closing fluid flow through said passage means in a direction away from said storage chamber in automatic response to the removal of said first valve body from said passage means wherein the first valve means be removed and repaired, if necessary, without affecting the integrity of the storage chamber.

2. The hydraulic dashpot as defined in claim 1 wherein said first valve body is housed for removal in a direction generally transverse to the movement of said second valve means.

3. The hydraulic dashpot as defined in claim 2 wherein said first valve body is housed for removal in a direction generally transverse to the movement of said second valve means, and means for biasing said second valve means in a direction toward said first valve body.

4. The hydraulic dashpot as defined in claim 2 wherein said first valve body includes an outer peripheral surface, said second valve means has an end in contact with said outer peripheral surface, and means for urging said second valve means in a direction to maintain the end thereof in contact with said outer peripheral surface.

5. The hydraulic dashpot as defined in claim 2 wherein said first valve body is seated in bore means disposed generally transversely to said passage means, said second valve means is seated in a bore for sliding movement generally transverse to said first valve body bore means, and said second valve means includes a generally axial fluid flow passage having normally open opposite ends of which one end closes upon the removal of said first valve body.

6. The hydraulic dashpot as defined in claim 2 wherein said outer peripheral surface is interrupted by a generally conical relieved portion to facilitate generally immediate movement of said second valve means to its fluid flow closing position upon initial motion imparted to said first valve body in the direction of removal.

7. The hydraulic dashpot as defined in claim 1 wherein said first valve body is housed for removal in a direction generally transverse to the movement of said second valve means, and means for biasing said second valve means in a direction toward said first valve body.

8. The hydraulic dashpot as defined in claim 1 wherein said first valve body includes an outer peripheral surface, said second valve means has an end in contact with said outer peripheral surface, and means for urging said second valve means in a direction to maintain the end thereof in contact with said outer peripheral surface.

9. The hydraulic dashpot as defined in claim 8 wherein said first valve body is seated in bore means disposed generally transversely to said passage means, said second valve means is seated in a bore for sliding movement generally transverse to said first valve body bore means, and said second valve means includes a generally axial fluid flow passage having normally open opposite ends of which one end closes upon the removal of said first valve body.

10. The hydraulic dashpot as defined in claim 8 wherein said outer peripheral surface is interrupted by a generally conical relieved portion to facilitate generally immediate movement of said second valve means to its fluid flow closing position upon initial motion imparted to said first valve body in the direction of removal.

11. The hydraulic dashpot as defined in claim 1 wherein said first valve body is seated in bore means disposed generally transversely to said passage means, said second valve means is seated in a bore for sliding movement generally transverse to said first valve body bore means, and said second valve means includes a generally axial fluid flow passage having normally open opposite ends of which one end closes upon the removal of said first valve body.

12. The hydraulic dashpot as defined in claim 1 wherein said first valve body is seated in bore means disposed generally transversely to said passage means, said second valve means is seated in a bore for sliding movement generally transverse to said first valve body bore means, said second valve means includes a generally axial fluid flow passage having normally open opposite ends of which one end closes upon the removal of said first valve body and said second valve means includes a generally cup-shaped body having a radial bore at said one end opening into said axial fluid flow passage.

13. The hydraulic dashpot as defined in claim 1 wherein said first valve body is seated in bore means disposed generally transversely to said passage means, said second valve means is seated in a bore for sliding movement generally transverse to said first valve body bore means, said second valve means includes a generally axial fluid flow passage having normally open opposite ends of which one end closes upon the removal of said first valve body and means for biasing said first valve body to close said one end thereof upon the removal of said first valve body.

14. The hydraulic dashpot as defined in claim 1 including a second valve body accommodating said second valve means, and said second valve means and second valve body have cooperative valve seats which are normally spaced from each other and contactingly close upon the removal of said first valve body from said passage means.

* * * * *